Nov. 18, 1969     H. SEIDEL     3,479,612
MODE CONTROL IN HIGH POWER LASER BY MEANS OF A LOW POWER LASER
Filed Nov. 18, 1966     2 Sheets-Sheet 1

INVENTOR
H. SEIDEL

BY
*Sylvan Sherman*
ATTORNEY

United States Patent Office 3,479,612
Patented Nov. 18, 1969

3,479,612
MODE CONTROL IN HIGH POWER LASER BY MEANS OF A LOW POWER LASER
Harold Seidel, Fanwood, N.J., assignor to Bell Telephone Laboratories, Incorporated, Murray Hill, N.J., a corporation of New York
Filed Nov. 18, 1966, Ser. No. 595,401
Int. Cl. H01s 3/10
U.S. Cl. 331—94.5                                  4 Claims

ABSTRACT OF THE DISCLOSURE

A "weak link" principle is set forth in which a low power, high integrity device superimposes a "template" action on a high power, low integrity device. The template action results in the weaker unit imprinting its preferred characteristics upon the stronger unit. In the illustrative embodiment disclosed, an asymmetric laser interferometer structure is employed to permit a weak laser to dominate a stronger laser. It is an advantage of such an arrangement that an otherwise broad spectrum laser can be confined to oscillate in a single mode.

---

Figure 1:
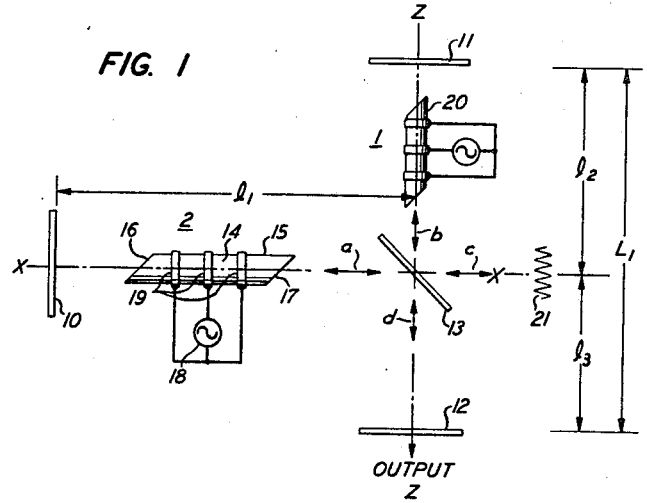

This invention relates to high power, high quality oscillators and amplifiers.

It is usually difficult, with the techniques of present technology, to device active circuits that simultaneously possess such diverse characteristics as high power, low distortion, large dynamic range, low noise, and so forth. The present invention sets forth a so-called "weak link" approach to this problem in which a low power, high integrity device produces a "template" action on a high power, low integrity device.

Typically, the weakest link of a chain is usually denigrated. However, the weakest link in an otherwise brass chain might be gold, and certainly not the least valued. Thus, to reckon the utilization of the chain only in terms of its brute strength is not necessarily to suggest its wisest use. To the contrary, what should be sought is a use wherein the desirable attributes of the weak unit are imprinted upon the stronger unit in a manner to control and improve the overall operating characteristics of the stronger unit.

The principles of the present invention are described in connection with an asymmetric laser interferometer system in which a weak laser is used to dominate a stronger one.

The development of the optical maser, or laser, as it is now commonly referred to, has made possible the generation of coherent and highly monochromatic electromagnetic wave energy in the optical frequency range. As used herein, the term "optical frequency range" shall be understood to extend from the farthest infrared to beyond the ultraviolet.

A laser oscillator typically comprises an optical cavity resonator in which there is located an appropriate active medium. Devices of this type, employing a cavity resonator formed by a pair of spaced, parallel reflectors, are described in United States Patent 2,929,922, issued on Mar. 22, 1960 to A. L. Schawlow and C. H. Townes. Resonators of this and other types are analyzed in Bell System Technical Journal articles by Fox and Li, volume 40, page 453; by Boyd and Gordon, volume 40, page 489; and by Boyd and Kogelnik, volume 41, page 1347.

Because optical cavity resonators are much larger than the wavelength of the signals supported therein, they are inherently multimode devices. As a consequence, laser oscillators are capable of simultaneously oscillating at a plurality of frequencies whose nominal center-to-center spacings, $f_c$, are given by $c/2L$, where $c$ is the velocity of light, and $L$ is the effective cavity length. Thus, the output spectrum from a laser oscillator typically consists of a plurality of spaced, discrete frequencies.

In addition, because the wavelengths of the oscillations are orders of magnitude smaller than the cavity length, the frequencies at which a laser oscillates are extremely sensitive to changes in the length of the cavity. As a result, the slightest change in cavity dimensions produces substantial changes in the output frequencies.

The generation of many frequencies in a laser is undesirable in that the unwanted modes represent a loss to the system. In a laser adapted for communications purposes, the excitation of many different modes, and their critical dependence upon the cavity dimensions, has an adverse effect on the stability of the laser, and on the modulation and demodulation processes. All of these factors are important considerations in communications systems.

In accordance with the present invention, a high power, multimode laser is constrained to oscillate in but a single mode by means of a low power laser. The two lasers are arranged in a manner similar to that disclosed in the copending application of M. Di Domenico and H. Seidel, Ser. No. 490,985, filed Sept. 28, 1965, which utilizes a two branched laser cavity structure, and a feedback arrangement for intercoupling the active laser materials located in the two branches of the cavity. The system is organized such that there is one, and only one, mode at which the two lasers can oscillate. Unlike the above-cited copending application, however, the two lasers are dissimilar in that one is a high power laser whereas the other is a low power laser. In addition, the two lasers advantageously have different, but overlapping gain characteristics that include no more than one oscillating mode in common. Finally, the feed back between the two lasers, and the coupling out of the two cavities are produced by means of an unequal power divider. In particular, the inequality is related to the relative field strengths of the two laser oscillators.

It is an advantage of the present invention that the oscillating mode of a high power laser can be controlled by a laser which is much weaker, but more refined in performance.

Figure 2:
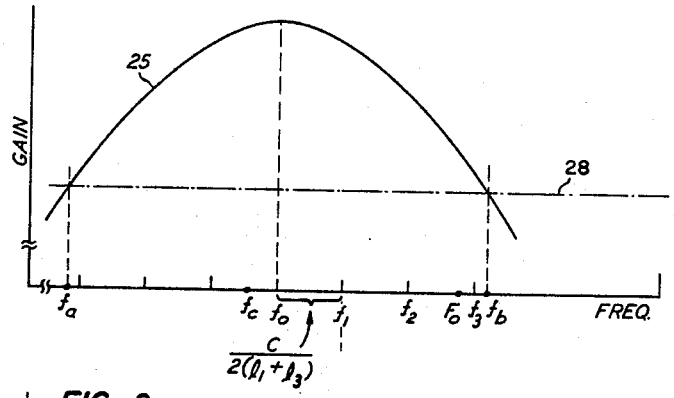
Figure 3:
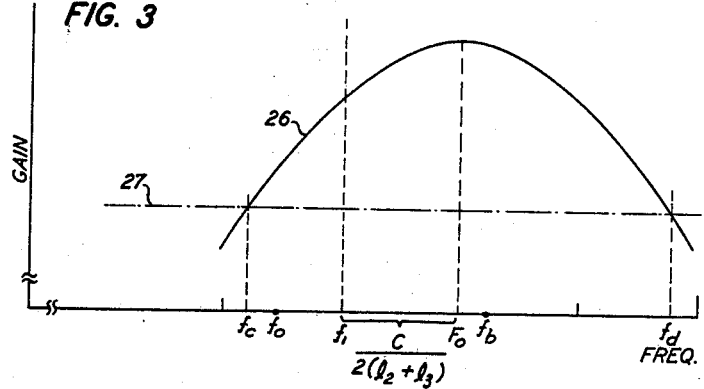
Figure 4:
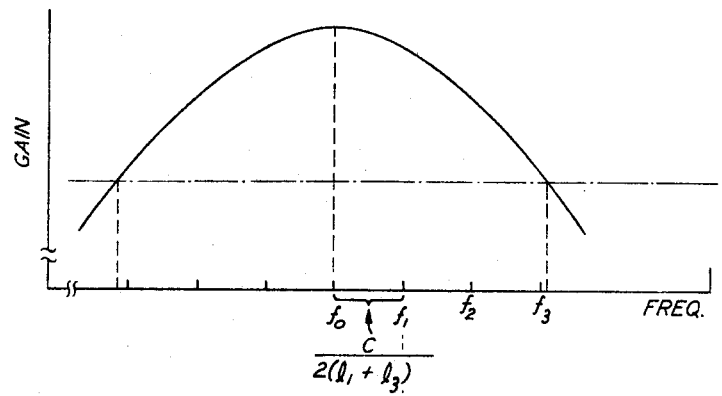
Figure 5:
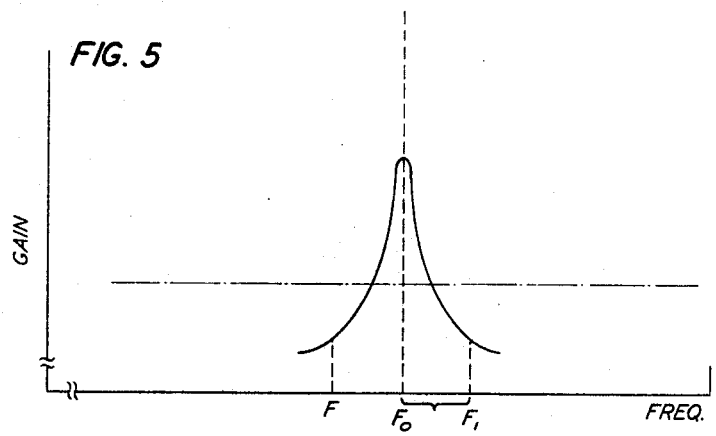
Figure 6:
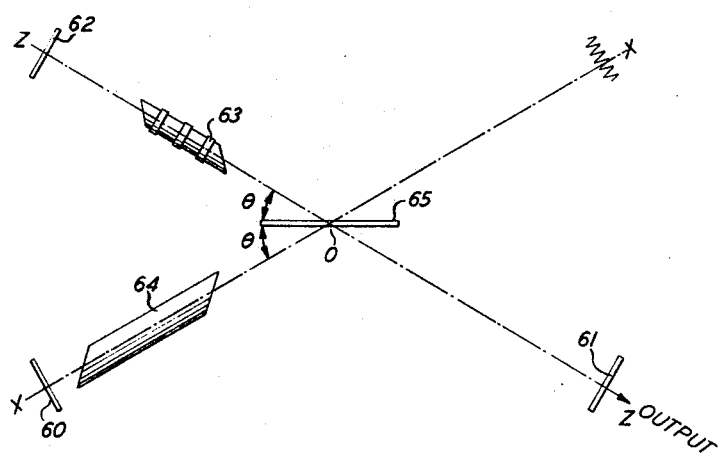

These and other features and advantages, the nature of the present invention, and its various features, will appear more fully upon consideration of the various illustrative embodiments now to be described in detail in connection with the accompanying drawings, in which:

FIG. 1 shows a first embodiment of the invention;
FIGS. 2 and 3 show typical gain versus frequency curves for the two lasers of FIG. 1;
FIGS. 4 and 5 show a second pair of gain curves for practicing the invention; and
FIG. 6 shows a second embodiment of the invention.

Referring to the drawings, FIG. 1 is a first illustrative embodiment of the invention wherein a relatively weak laser oscillator 1 is used to control the operating characteristics of a much stronger laser oscillator 2. In this embodiment, the laser cavities are defined by three planar mirrors 10, 11 and 12. The centers of mirrors 11 and 12 are spaced apart a distance $L_1$ and are aligned along a common axis Z—Z, with their reflective surfaces parallel to each other. Mirror 10, on the other hand, is oriented with its surface perpendicular to the surfaces of mirrors 11 and 12, and is located between mirrors 11 and 12 at a distance $l_1$ from axis Z—Z.

As is common practice in the laser art, one of the mirrors is partially transmissive; i.e., a few percent, and constitutes the output aperture of the oscillator through which energy is abstracted from the oscillator. In the embodiment of FIG. 1, mirror 12 is partially transmissive, while mirrors 10 and 11 are made as highly reflective as the art permits.

Located at the intersection of axis Z—Z and the normal X—X to mirror 10, is a beam splitter 13, which, for example, can be a partially silvered mirror, oriented with its surface at 45 degrees to the mirror surfaces. As will be explained in greater detail hereinbelow, the beam splitter divides the energy incident thereon unequally, advantageously transmitting less energy than it reflects. Thus, beam splitter 13 can be considered to be a directional coupler having some arbitrary power division ratio. As such, it has two pair of conjugate ports and has the property that an incident signal, applied to one port of one pair of conjugate ports, divides unequally between the other pair of conjugate ports.

For purposes of identification, the four ports of beam splitter 13 are labeled $a$, $b$, $c$ and $d$, of which ports $a$ and $b$ are one conjugate pair, and $c$ and $d$ are the other conjugate pair.

Located in the region between one of the mirrors 10 and beam splitter 13, and coupling into port $a$ of the beam splitter, is a first active laser medium 14. In the arrangement depicted, medium 14 is a gas or gas mixture contained within an elongated tube 15, whose longitudinal axis is aligned along axis X—X. In accordance with current practice, the end surfaces 16 and 17 of tube 15 are inclined at Brewster's angle to the container axis. The laser material is excited by means of a high frequency power source 18 coupled to conductive straps 19, which encircle tube 15. It is recognized, however, that the invention is not limited to any particular laser material nor any particular method of excitation. The arrangement described above, and shown in FIG. 1, is merely intended to be illustrative.

A second laser material 20, and suitable excitation means, are located in the region between mirror 11 and beam splitter 13. The output from material 20 couples into port $b$ of the beam splitter.

In accordance with the invention the two laser materials differ in that one is capable of generating significantly more power than the other. Thus, if they are of the same material, the physical dimensions of the two are significantly different. Advantageously, however, the laser materials have, in addition, significantly different, though overlapping emission characteristics which include at least one oscillating mode in common. Thus, in FIG. 1 one of the laser materials 14 is shown to be larger than the other. In addition, the two materials 14 and 20 are further characterized as different. As an example, material 14 can be essentially $neon^{20}$, whereas material 20 is essentially $neon^{22}$. (For a discussion of the emission bands of these two isotopes of neon, see the copending application by E. F. Labuda, Ser. No. 539,893, filed Apr. 4, 1966, and assigned to applicant's assignee.)

For purposes of explanation, the structure of FIG. 1 can be considered, at the outset, as comprising two independent lasers. It should be understood, however, that such a simplifying assumption results in certain generalizations which are not strictly accurate. Nevertheless, it has the advantage that it provides a convenient means by which the operation of the invention can be explained and, further, the results obtained are consistent with the actual workings of the device.

Referring again to FIG. 1, the higher power laser 2 is defined by the cavity formed by mirrors 10 and 12 and includes the laser material 14. The other laser 1 is defined by the cavity formed by mirrors 11 and 12 and includes the second laser material 20. Each of these lasers is characterized by a gain versus frequency profile whose center frequency is a function of the composition of the laser material. Typical gain curves 25 and 26, for two dissimilar neon lasers, are shown in FIGS. 2 and 3, wherein curve 25 is centered about frequency $f_0$, whereas curve 26 is centered about a different frequency $F_0$. Also shown are the threshold levels 27 and 28 at which the gain per pass for each laser exceeds the typical losses in the system due to useful loading, scattering, reflection, et cetera. (An additional loss, due to the coupling action of beam splitter 13 is separately discussed below and is not included as one of the losses which establish the threshold level.)

As is known, an optical cavity is capable of supporting many modes of oscillations. The longitudinal mode frequencies for the lowest order transverse modes for the cavity defined by mirrors 10 and 12 are represented graphically in FIG. 2 by the short vertical lines along the frequency axis. The nominal frequency separation between these cavity modes is given by $c/2L$. Designating the distance between mirror 12 and beam splitter 13 as $l_3$, the frequency separation between center frequency $f_0$ and the modes that can be supported within this first cavity are, therefore, multiples of $c/2(l_1+l_3)$.

A similar set of cavity modes exists for the second cavity defined by mirrors 11 and 12. These are depicted in FIG. 3, and are spaced apart a distance $c/2(l_2+l_3)$, where $l_2$ is the distance between mirror 11 and beam splitter 13.

Since oscillations will occur for only those modes having a gain which exceeds the threshold levels 26 and 27, it can be seen from FIG. 2 that the laser characterized by curve 25 is capable of supporting only those modes whose frequencies are between $f_a$ and $f_b$. Similarly, the laser characterized by curve 26, in FIG. 3, is capable of supporting only those modes whose frequencies are between $f_c$ and $f_d$.

So far in this discussion, the two lasers have been considered to operate independently of each other. It is apparent, however, that this is not so. For example, signal energy generated by laser material 14 enters port $a$ of beam splitter 13 wherein it divides. One portion of this signal is transmitted through the beam splitter, whereas the remaining portion is reflected towards mirror 12. The transmitted portion is coupled out of the cavity structure through port $c$ and is lost. This loss is represented by the resistive termination 21. It should be observed however, that it is not necessary to provide a specific terminating element. The mere coupling out of the cavity, with no means for coupling back into the cavity, represents a loss to the system. In fact, in the absence of further provisions for avoiding this loss of energy in the system, the laser would not operate. The manner in which this loss is selectively avoided will become apparent.

As to the signal component reflected toward mirror 12, it is reflected back toward the beam splitter and again divides. Part of the signal is reflected back towards mirror 10 and the active material 14, whereas the other part is transmitted through beam splitter 13 towards mirror 11 and the laser material 20. Thus, energy generated in laser matreial 14 stimulates the laser material 20.

A similar analysis of the action of the system on energy generated in laser material 20 shows that this energy is directed into and stimulates laser material 14. Such an analysis also shows that a portion of the energy generated by laser material 20 is also coupled out of the cavity by the action of the beam splitter.

As noted above, unless the gain in the system is unusually high, the coupling action of the beam splitter (which results in a substantial amount of energy being coupled out of the cavity) would totally prevent the system from oscillating. Thus, in order for the system to oscillate at all, further cooperation between the two interacting laser systems is required. In accordance with the invention, this further cooperation manifests itself in the ratio in which the beam splitter divides the signals present in the paths containing the two active media, and in the tuning of the two cavities.

For the conditions depicted in FIGS. 2 and 3, at most, only those signal modes that lie within the respective bands $f_a$ to $f_b$ and $f_c$ to $f_d$ are capable of experiencing sufficient gain to oscillate, where the two lasers operate independently. However, as has been shown, they do not operate independently, and, in fact, neither can operate in the absence of the other. Thus, more specifically, it is only over the restricted overlapping frequency range between $f_c$ and $f_b$, which the two lasers share in common, that cooperation is even possible.

It is a recognized fact that in order to synchronize two or more oscillators, the organized state of the system must be highly distinguished from all other possible unorganized states and, further, the organized state must offer so compelling an advantage to system function that the oscillators accept the loss of the degrees of freedom of their independent operation and accept a collective interaction. Conditions, therefore, are established whereby operation at one particular mode is readily preferable to operation at any other mode. These conditions include a common frequency and low loss at that frequency.

In general, the modes in the two lasers are independent of each other, depending solely on the effective lengths of the respective cavities. The first requirement for cooperation therefore, is met by adjusting the respective cavity lengths so that the two cavities have one and, preferably, only one mode in common.

One arrangement, which is not unique but included for purposes of illustration, is to adjust each of the lasers such that they would each oscillate at their maximum emission modes $f_0$ and $F_0$, respectively, if they were capable of independent operation. However, by construction, the lasers cannot operate independently. They are forced, therefore, to seek a mutually satisfactory state for joint operation. One such satisfactory state is realized by adjusting either $l_1$, $l_2$ or both such that $$\frac{c}{2(l_1+l_3)}+\frac{c}{2(l_2+l_3)}=|F_0-f_0| \quad (1)$$

So adjusted, one of the cavity modes $f_1$ for the first laser coincides with one of the cavity modes $f_1$ in the second laser. To insure that no other common oscillating mode can exist within the frequency range of $f_c-f_b$, this range is limited such that the net gain of at least one of the lasers is inadequate to sustain oscillations at any other common mode that might be found. So adjusted the two lasers have but one oscillating frequency in common.

The second requirement for cooperation is met by minimizing the net energy coupled out of the system at the common frequency $f_1$. This condition requires that the two signal fields produced by the two lasers at port $c$ be equal so that they can cancel under suitable phase conditions. Accordingly, the signal field transmitted through the beam splitter from port $a$ to port $c$ is made equal to the signal field incident upon port $b$ and reflected by the beam splitter to port $c$. Designating the field contributed by laser 2 at port $a$ as $E_2$, and the field contributed by laser 1 at port $b$ as $E_1$, then $$tE_2=kE_1 \quad (2)$$

where:

$t$ is the coefficient of transmission of beam splitter 13, $k$ equals the coefficient of reflection of beam splitter 13, and $|k|^2+|t|^2=1$ Since minimum loss at the common frequency is realized when these two signals cancel each other, the two lasers, seeking a suitable accommodation, adjust themselves so that the two signals are 180 degrees out of phase and, thereby experience destructive interference at port $c$ of the beam splitter. Under these conditions, the net power coupled out of the system at frequency $f_1$ is minimized. As there are no other modes common to both lasers, there are no other frequencies for which signal cancellation can occur in port $c$. Power, therefore, would be lost from the system at all other frequencies, thereby precluding oscillations at frequencies other than $f_1$.

In the embodiment of the invention described above, gain curves of comparable bandwidth are illustrated. It is understood, however, that the invention can be practiced using a variety of active materials having significantly different gain curves as illustrated, for example, in FIGS. 4 and 5. In this second embodiment, one of the two lasers has a much narrower gain curve than the other laser. For purposes of illustration the weak laser gain curve, illustrated in FIG. 5, has only one significant mode $F_0$ at the center of the gain curve. Accordingly, the cavity of the high power laser, whose gain curve is illustrated in FIG. 4, is adjusted so that one of its modes $f_1$ is made equal to $F_0$, the center frequency of the weak laser. The power division ratio of the beam splitter is adjusted in accordance with Equation 1 and in all respects the lasers operate, as explained hereinabove, to produce a signal output as determined by the weaker laser. As an example of one such system, the broadband, high power laser can be made of calcium fluoride ($CaF_2$) doped with 1% of $Nd^{3+}$. This material has an emission band centered at 10460 A. A nitrogen laser, having an emission band centered at 10461 A., can be used as the narrow band, low power unit.

In the embodiment of FIG. 1, beam splitter 13 was described as a partially silvered mirror. To prepare a beam splitter of this type requires a reasonably accurate knowledge of the respective field strengths of the two lasers in order that the beam splitter have the correct coefficients of transmission and reflection to produce cancellation of the signal in port $c$. If this knowledge is not accurately known, a more advantageous arrangement would include means for adjusting the power division ratio. Such an arrangement is illustrated in FIG. 6, which includes, as before, a multibranched cavity comprising three mirrors 60, 61 and 62 and two regions of active laser materials 63 and 64. The beam splitter 65 in this embodiment, is simply a piece of glass or other transparent material. As is known, as the angle of incidence approaches and then increases beyond a critical angle, the transmission through a denser medium decreases and eventually the medium becomes totally reflective. Thus, by operating in the region of the critical angle for the glass, the desired coefficients of transmission and reflectivity can be achieved.

In operation, the first laser comprising mirrors 61, 62 and material 63 is mounted as a unit that can be rotated about the center O of beam splitter 65. Similarly, mirror 60 and material 64 are mounted as a second unit that can similarly be rotated about the center O of the beam splitter. The desired power division ratio is obtained simply by adjusting the angle $\theta$ made by each of the respective axes Z—Z and X—X of the two units until oscillations are produced at the common frequency.

In all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination;
first and second laser oscillators each comprising a first mirror, a laser medium, and each sharing a second mirror in common;
said first mirrors and said common second mirror forming a pair of resonant cavities for said oscillators;
at least one of said mirrors being partially transmissive for abstracting wave energy from said oscillators;
said lasers having different power outputs and dissimilar but overlapping gain versus frequency characteristics that include no more than one oscillating frequency in common;
and a power divider for coupling wave energy unequally between said oscillators and out of said cavities such that the net power coupled out of said cavities at said common frequency is minimized.

2. The combination according to claim 1 wherein the coefficient of transmission $t$ and the coefficient of reflectivity $k$ of said power divider are related to the electric fields $E_2$ and $E_1$ of said two lasers such that $$E_2 t = E_1 k$$

where $$|k|^2 + |t|^2 = 1$$

3. The combination according to claim 1 wherein said power divider is a partially silvered mirror.

4. The combination according to claim 1 wherein said power divider is a transparent medium, and wherein the angles of incidence of the wave energy directed thereon from said two lasers are equal and adjustable about the critical angle for said medium.

References Cited

UNITED STATES PATENTS 3,414,840  12/1968  DiDomenico et al. ___ 331—94.5

RONALD L. BERT, Primary Examiner

P. K. GODWIN, Assistant Examiner

U.S. Cl. X.R.

350—163